(12) United States Patent
Takajo et al.

(10) Patent No.: US 10,147,527 B2
(45) Date of Patent: Dec. 4, 2018

(54) GRAIN-ORIENTED ELECTRICAL STEEL SHEET AND METHOD FOR MANUFACTURING SAME

(71) Applicant: JFE Steel Corporation, Tokyo (JP)

(72) Inventors: Shigehiro Takajo, Tokyo (JP); Seiji Okabe, Tokyo (JP); Hirotaka Inoue, Tokyo (JP); Michiro Komatsubara, Tokyo (JP)

(73) Assignee: JFE Steel Corporation (JP)

( * ) Notice: Subject to any disclaimer, the term of this patent is extended or adjusted under 35 U.S.C. 154(b) by 779 days.

(21) Appl. No.: 14/367,273

(22) PCT Filed: Dec. 28, 2012

(86) PCT No.: PCT/JP2012/008423
§ 371 (c)(1),
(2) Date: Jun. 20, 2014

(87) PCT Pub. No.: WO2013/099281
PCT Pub. Date: Jul. 4, 2013

(65) Prior Publication Data
US 2015/0248957 A1    Sep. 3, 2015

(30) Foreign Application Priority Data

Dec. 28, 2011  (JP) .................. 2011-289200

(51) Int. Cl.
*H01F 1/16*   (2006.01)
*H01F 1/147*  (2006.01)
(Continued)

(52) U.S. Cl.
CPC ..... *H01F 1/14775* (2013.01); *B23K 15/0006* (2013.01); *B23K 26/0006* (2013.01);
(Continued)

(58) Field of Classification Search
CPC ........................ C21D 6/008; H01F 1/14775
(Continued)

(56) References Cited

U.S. PATENT DOCUMENTS 4,293,350 A   10/1981  Ichiyama et al.
5,411,604 A *  5/1995  Inokuti ............... H01F 41/0233
                                                148/112
(Continued)

FOREIGN PATENT DOCUMENTS

EP    0 571 705    12/1993
EP    0 897 016     2/1999
(Continued)

OTHER PUBLICATIONS

Chinese Office Action dated Jul. 3, 2015 along with an English translation from corresponding Chinese Application No. 2012800650263.
(Continued)

*Primary Examiner* — Jie Yang
(74) *Attorney, Agent, or Firm* — DLA Piper LLP (US)

(57) ABSTRACT

A grain-oriented electrical steel sheet exhibits reduced iron loss and reduced noise. The electrical steel sheet has magnetic domains refined by regions with a high lattice defect density being locally formed on the surface of or within the steel sheet, in which the regions with a high lattice defect density has a hardness, as measured by a micro Vickers hardness meter, equal to or lower than that of other regions.

4 Claims, 5 Drawing Sheets

(51) Int. Cl.

| | | |
|---|---|---|
| *C22C 38/00* | (2006.01) | |
| *C22C 38/04* | (2006.01) | |
| *C22C 38/60* | (2006.01) | |
| *C22C 38/02* | (2006.01) | |
| *C22C 38/08* | (2006.01) | |
| *C22C 38/12* | (2006.01) | |
| *C22C 38/16* | (2006.01) | |
| *C22C 38/18* | (2006.01) | |
| *C21D 8/12* | (2006.01) | |
| *B23K 15/00* | (2006.01) | |
| *C22C 38/34* | (2006.01) | |
| *H01F 41/02* | (2006.01) | |
| *B23K 26/00* | (2014.01) | |
| *B23K 26/082* | (2014.01) | |
| *B23K 26/0622* | (2014.01) | |
| *B23K 26/354* | (2014.01) | |
| *B23K 26/352* | (2014.01) | |
| *C21D 6/00* | (2006.01) | |
| *B23K 101/18* | (2006.01) | |
| *B23K 101/36* | (2006.01) | |
| *B23K 103/04* | (2006.01) | |
| *B23K 103/00* | (2006.01) | |

(52) U.S. Cl.
  CPC ........ *B23K 26/0622* (2015.10); *B23K 26/082* (2015.10); *B23K 26/352* (2015.10); *B23K 26/354* (2015.10); *C21D 8/1294* (2013.01); *C22C 38/00* (2013.01); *C22C 38/002* (2013.01); *C22C 38/004* (2013.01); *C22C 38/008* (2013.01); *C22C 38/02* (2013.01); *C22C 38/04* (2013.01); *C22C 38/08* (2013.01); *C22C 38/12* (2013.01); *C22C 38/16* (2013.01); *C22C 38/18* (2013.01); *C22C 38/34* (2013.01); *C22C 38/60* (2013.01); *H01F 1/16* (2013.01); *H01F 41/02* (2013.01); *B23K 2101/18* (2018.08); *B23K 2101/36* (2018.08); *B23K 2103/04* (2018.08); *B23K 2103/50* (2018.08); *C21D 6/008* (2013.01); *C21D 2201/05* (2013.01)

(58) Field of Classification Search
  USPC ........................................................ 148/112
  See application file for complete search history.

(56) References Cited

U.S. PATENT DOCUMENTS

| | | | |
|---|---|---|---|
| 5,665,455 A | 9/1997 | Sato et al. | |
| 5,714,017 A | 2/1998 | Tomida et al. | |
| 6,368,424 B1* | 4/2002 | Sakai ..................... | H01F 1/16 148/111 |
| 2015/0034211 A1* | 2/2015 | Takajo .................. | C21D 8/12 148/121 |

FOREIGN PATENT DOCUMENTS

| | | |
|---|---|---|
| EP | 1 149 924 | 10/2001 |
| EP | 1 154 025 | 11/2001 |
| EP | 1 607 487 | 12/2005 |
| EP | 2 226 399 | 9/2010 |
| JP | S6092479 | 5/1985 |
| JP | 2-8027 | 2/1990 |
| JP | H03-13293 B2 | 2/1991 |
| JP | 6-136449 | 5/1994 |
| JP | 07-65106 | 7/1995 |
| JP | 5-295446 | 11/1996 |
| JP | 9-71817 | 3/1997 |
| JP | 201181805 | 7/2001 |
| JP | 3500103 | 2/2004 |
| JP | 2005-336529 | 12/2005 |
| JP | 4123679 | 7/2008 |
| JP | 4344264 | 10/2009 |
| JP | 4782248 | 9/2011 |
| KR | 10-0224283 | 12/1996 |
| KR | 10-0259990 | 7/2000 |
| WO | 00/16408 | 3/2000 |
| WO | 2011/158519 | 12/2011 |

OTHER PUBLICATIONS

V. Permiakov, L. Dupre, D. Makaveev, and J. Melkebeek, "Dependence of power losses on tensile stress for Fe—Si nonoriented steel up to destruction," *Journal of Applied Physics*, vol. 91, No. 10, May 15, 2002, pp. 7854-7856.

M. Fujikura, S. Arai and T. Kubota, "Effect of Laser Irradiation on the Magnetostriction of Grain-Oriented Electrical Steels," vol. 25, No. 4-2, 2001, pp. 895-898.

Keji Ueda, Shigeru Endo and Takayuki Ito, "780 MPa Grade Steel Plates with Low Yield Ratio by Microstructural Control of Dual Phase," *JFE Technical Report No. 18*, (Nov. 2007), pp. 23-28.

Y. Shingaki and S. Okabe, "Influence of TiN High-tensile Stress Coating on Magnetic Properties in Grain oriented Electrical Steel," *Journal of Magnetics Society of Japan*, vol. 35, No. 3, 2011, pp. 180-184.

Korean Notice of Reasons for Rejection dated Apr. 20, 2015 along with an English translation from corresponding Korean Application No. 10-2014-7016361.

Japanese Office Action dated Jun. 30, 2015 of corresponding Japanese Application No. 2011-289200 along with an English translation.

Supplementary European Search Report dated Aug. 18, 2015 of European Application No. 12862726.2.

Ponnaluri, S., et al., "Core loss reduction in grain-oriented silicon steels by excimer laser scribing Part I: experimental work," *Journal of Materials Processing Technology*, vol. 112, 2001, pp. 199-204.

* cited by examiner

GRAIN-ORIENTED ELECTRICAL STEEL SHEET AND METHOD FOR MANUFACTURING SAME

TECHNICAL FIELD

This disclosure relates to a grain oriented electrical steel sheet for use as an iron core of a transformer or the like, and to a method of manufacturing the same.

BACKGROUND

In recent years, in the context of efficient use of energy, there have been increasing demands mainly transformer manufacturers and the like, for an electrical steel sheet with high flux density and low iron loss.

The flux density can be improved by making crystal orientations of the electrical steel sheet in accord with the Goss orientation. JP 4123679 B2, for example, discloses a method of producing a grain-oriented electrical steel sheet having a flux density $B_8$ exceeding 1.97 T.

On the other hand, iron loss properties may be improved by increased purity of the material, high orientation, reduced sheet thickness, addition of Si and Al, and magnetic domain refining (for example, see "*Recent progress in soft magnetic steels,*" $155^{th}/156^{th}$ *Nishiyama Memorial Technical Seminar, The Iron and Steel Institute of Japan*, Feb. 10, 1995). Iron loss properties, however, tend to worsen as the flux density $B_8$ is higher, in general.

It is known, for example, that when the crystal orientations are in accordance with the Goss orientation to improve the flux density $B_8$, the magnetostatic energy decreases and, therefore, the magnetic domain width widens, causing eddy current loss to rise.

In view of this, as a method for reducing eddy current loss, some techniques have been used to refine magnetic domains by improving film tension (for example, see JP H02-8027 B2) and by applying thermal strain.

With the method of improving film tension as disclosed in JP H02-8027 B2, however, the strain applied near a elastic region is small, which places a limit on the iron loss reduction effect.

On the other hand, magnetic domain refining by application of thermal strain is performed using plasma flame irradiation, laser irradiation, electron beam irradiation and the like.

For example, JP H07-65106 B2 discloses a method of producing an electrical steel sheet having a reduced iron loss $W_{17/50}$ of below 0.8 W/kg due to electron beam irradiation. It can be seen from JP H07-65106 B2 that electron beam irradiation is extremely useful in reducing iron loss.

In addition, JP H03-13293 B2 discloses a method of reducing iron loss by applying laser irradiation to a steel sheet.

Meanwhile, it is known that irradiation with a plasma flame, laser, an electron beam and the like increases hysteresis loss, while causing magnetic domain refinement which reduces eddy current loss.

For example, JP 4344264 B2 states that any hardening region caused in a steel sheet through laser irradiation and the like hinders domain wall displacement so as to increase hysteresis loss.

To solve the aforementioned problem, JP 4344264 B2 discloses a technique to further reduce iron loss by adjusting the laser output and the spot diameter ratio to thereby reduce the size of a region, which hardens with laser irradiation in a direction perpendicular to the laser scanning direction, to 0.6 mm or less, and by suppressing an increase in hysteresis loss due to the irradiation.

Furthermore, there has been an increasing demand for a recent transformer to be reduced in noise, as well as to have high flux density and low iron loss, to offer good living conditions. It is believed that the noise of a transformer is primarily caused by stretching movement of the crystal lattice of the iron core, and many studies have shown that reducing single sheet magnetic strain is effective in suppressing the transformer noise (for example, see JP 3500103 B2).

While the method of reducing iron loss disclosed in JP 4344264 B2 reduces the size of a hardening region in the steel sheet, the region with the reduced size of 0.6 mm or less is inevitably formed with an excessively hardening region, which is defined to "exhibit an increase in hardness of the steel sheet surface due to work hardening by 5 or more when measured using a micro Vickers hardness meter."

Generally, in carrying out magnetic domain refining by irradiating a steel sheet with a heat beam, a light beam, or a particle beam, it is believed that a larger rapid thermal deformation of the steel sheet caused near the irradiated portion and/or a lager reaction force applied to the steel sheet as induced by rapid vaporization of the coating result in a dislocation region with a higher density formed in the steel sheet near the irradiated portion, leading to an increase in the hardness of the steel sheet. We believe that a higher dislocation density increases hysteresis loss, as reported in, for example, "*J. appl. phys,* 91" (2002), p. 7854 (NPL 2), that a steel sheet exhibits an increase in hysteresis loss upon tensile deformation.

In addition, as the irradiated portion hardens more, the irradiated material tends to suffer more pronounced deflection concaved on the irradiated surface side. The presumed reason therefore is that a higher degree of hardening causes a larger residual stress.

The electrical steel sheets on which magnetic domain refining has been performed by irradiating with a heat beam, a light beam, or a particle beam, are primarily stacked in a flat configuration for use as iron cores of a transformer. A steel sheet with a larger deflection is to be applied with a higher internal stress when flattened for shape correction. Consequently, upon excitation, iron cores take such a deformation mode as to release the internal stress, as well as the deformation due to stretching movement of the crystal lattice, leading to an increase in noise.

Focusing on the fact that the conventional method of reducing iron loss as disclosed in JP 4344264 B2 can reduce the size of a hardening region in the steel sheet, but the region with the reduced size of 0.6 mm or less is formed with an excessively hardening region, which is defined to "exhibit an increase in hardness due to work hardening by 5% or more when measuring the hardness of the steel sheet surface using a micro Vickers hardness meter," we assumed that the hysteresis loss and noise may be further reduced if such hardening can be suppressed.

Note that it is generally possible to inhibit an increase in hysteresis loss and even an increase in noise if an increase in hardness can be minimized by reducing energy with which the steel sheet is irradiated. When the irradiation energy is reduced, however, there arises a problem that magnetic domain refining becomes less effective in reducing eddy current loss, resulting in a higher total iron loss (hysteresis loss plus eddy current loss) (see "*Journal of Magnetics Society of Japan,* Vol, 25" (2001), p. 895 (NPL 3)).

SUMMARY

We thus provide:

[1] A grain-oriented electrical steel sheet comprising magnetic domains refined by regions with a high lattice defect density being locally formed on a surface of or within the steel sheet, wherein the regions with a high lattice defect density has a hardness, as measured by a micro Vickers hardness meter, equal to or lower than that of other regions.

[2] A method of manufacturing the grain-oriented electrical steel sheet of the aspect [1], the method comprising irradiating a steel sheet having a ratio of hysteresis loss to total iron loss of less than 45%, with a heat beam, a light beam, or a particle beam, in a direction forming an angle of 30° or less with a direction orthogonal to a rolling direction, at periodic intervals of 10 mm or less in the rolling direction.

[3] The method of manufacturing the grain-oriented electrical steel sheet according to the aspect [2], wherein the irradiating with the particle beam is irradiating with charged particles smaller in mass than Fe.

[4] The method of manufacturing the grain-oriented electrical steel sheet according to the aspect [2] or [3], wherein the irradiating with a heat beam, a light beam, or a particle beam is performed under a condition in which the beam is scanned over an irradiation portion on the steel sheet at an average rate of 30 m/s or lower.

It is possible to manufacture a grain-oriented electrical steel sheet that does not exhibit any increase in the hardness of any irradiated portion by irradiating a heat beam, a light beam, or a particle beam, and that exhibits low iron loss $W_{17/50}$ of less than 0.80 W/kg and low noise of 45 dBA or lower. Note that noise varies with background noise, which was thus adjusted to be 25 dBA at all times of the measurements.

Thus, our steel sheets may reduce iron loss, to thereby achieve not only improved energy efficiency, but also noise reduction of transformers, and is therefore extremely useful in industrial terms.

DETAILED DESCRIPTION

We investigated the effects of the material properties before magnetic domain refinement carried out through irradiation with a heat beam, a light beam, or a particle beam, on the iron loss after the magnetic domain refinement, and identified advantageous material properties to reduce iron loss.

Consequently, we discovered that screening of materials to be irradiated allows a sufficient iron loss reduction effect to be obtained with lower irradiation energy than required with conventional techniques.

We also discovered that the ability of reducing the irradiation energy dramatically reduces the degree of hardening of the steel sheet caused by the irradiation, and even reduces transformer noise.

Moreover, we discovered that iron loss and noise may be further reduced by extending the irradiation time, by irradiating a steel sheet with charged particles smaller in mass than Fe for heat beam irradiation, light beam irradiation, and/or particle beam irradiation, or by scanning the beam over an irradiation portion on the steel sheet at an average rate of 30 m/s or lower.

The aforementioned solutions will be described in detail below.

Screening of Advantageous Material Properties for Reducing Iron Loss

We found that magnetic properties (eddy current loss and hysteresis loss) after magnetic domain refining treatment are affected by the iron loss before the treatment.

Figure 1:
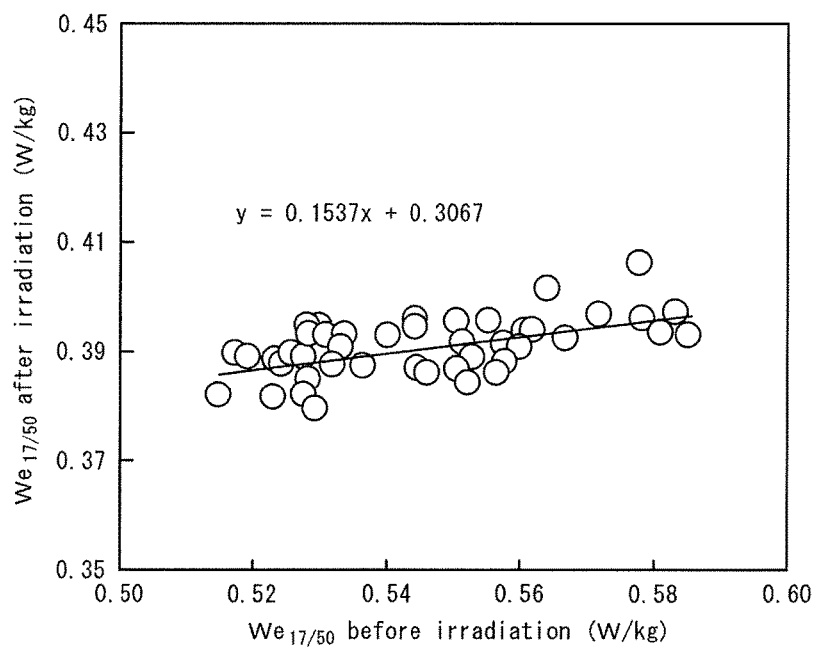
FIG. 1 is a graph showing a relationship between eddy current loss $We_{17/50}$ before Ar plasma flame irradiation and eddy current loss $We_{17/50}$ after Ar plasma flame irradiation.
Figure 2:
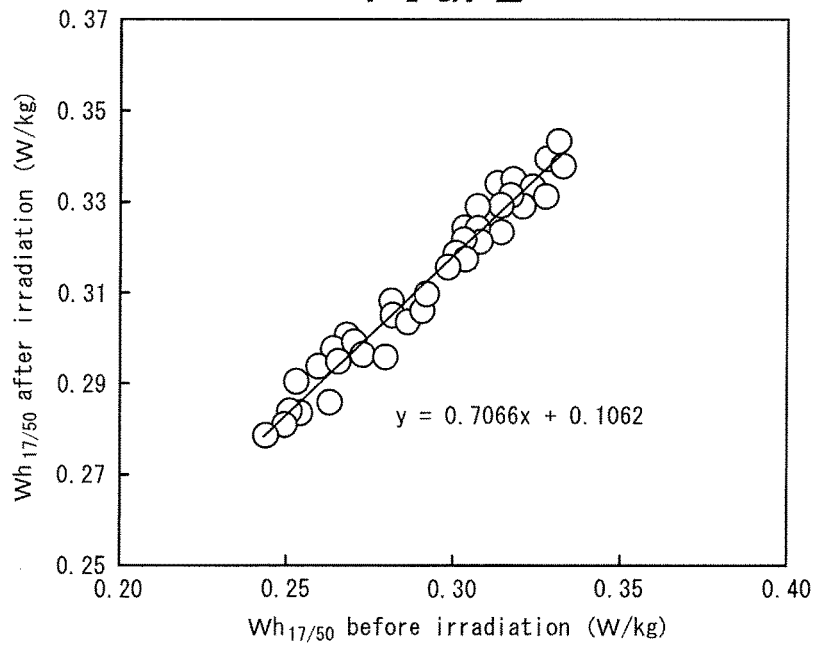
FIG. 2 is a graph showing a relationship between hysteresis loss $Wh_{17/50}$ before Ar plasma flame irradiation and hysteresis loss $Wh_{17/50}$ after Ar plasma flame irradiation.

That is, as shown in FIG. 1, post-irradiation eddy current loss $We_{17/50}$ decreases as pre-irradiation eddy current loss $We_{17/50}$ is lower, and as shown in FIG. 2, post-irradiation hysteresis loss $Wh_{17/50}$ decreases as pre-irradiation hysteresis loss $Wh_{17/50}$ is lower. Note that eddy current loss $We_{17/50}$ is total iron loss $W_{17/50}$ minus hysteresis loss $Wh_{17/50}$, and the plotted data points represent the measurement results of samples having the same chemical composition and the same coating tension. In addition, the magnetic domain refining technique used in this case was based on Ar plasma flame irradiation and performed under the same irradiation conditions.

It can be seen from the above results that it is important to reduce both pre-irradiation eddy current loss and pre-irradiation hysteresis loss to reduce post-irradiation iron loss.

Figure 3:
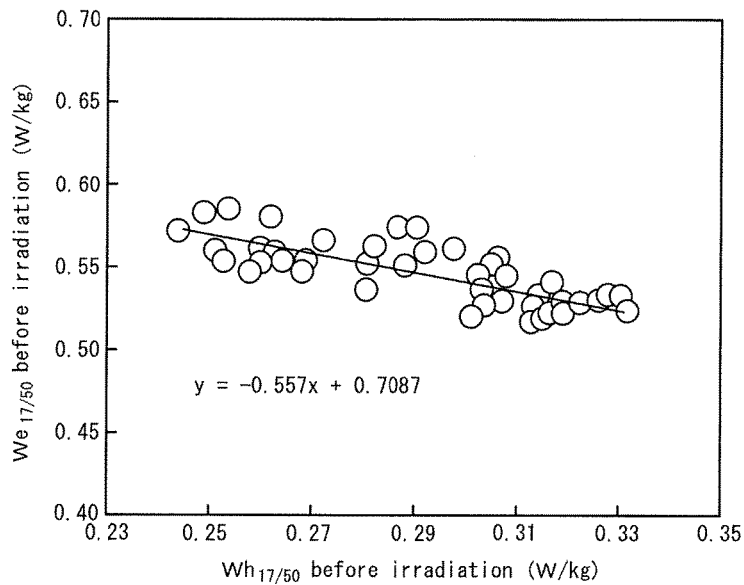
FIG. 3 is a graph showing a relationship between hysteresis loss $Wh_{17/50}$) before Ar plasma flame irradiation and eddy current loss $We_{17/50}$ before Ar plasma flame irradiation.

For general grain-oriented electrical steel sheets, the reduction of both pre-irradiation eddy current loss and pre-irradiation hysteresis loss may be achieved by increasing the coating tension, yet steel sheets with lower hysteresis loss tend to exhibit higher eddy current loss when the coating tension, the chemical composition and the like are the same, as shown in FIG. 3. The reason is that hysteresis loss increases as more auxiliary magnetic domains such as lancet domains form, which are generated when the orientation of crystal grains deviates from the Goss orientation, in other words, as the flux density is lower, whereas a deviation of the orientation of crystal grains from the Goss orientation narrows the magnetic domain width, causing the eddy current loss to decrease.

It has thus been unclear so far which is more advantageous, namely: a low hysteresis loss with high eddy current before irradiation; or, conversely, a high hysteresis loss with low eddy current loss before irradiation, in terms of reducing post-irradiation iron loss.

We found, based on the experimental results, that post-irradiation iron loss has good correlation with pre-irradiation hysteresis loss, as shown by the following equation:

$$\begin{aligned}
\text{post-irradiation iron loss} &= \\
\text{post-irradiation hysteresis loss} &+ \text{post-irradiation eddy current loss} \approx \\
0.71 &\times \text{pre-irradiation hysteresis loss} + 0.11 + \\
0.15 &\times \text{pre-irradiation eddy current loss} + 0.31 \approx \\
0.71 &\times \text{pre-irradiation hysteresis loss} + 0.11 + \\
0.15(&-0.56 \times \text{pre-irradiation hysteresis loss} + 0.71) + 0.31 \approx \\
&0.62 \times \text{pre-irradiation hysteresis loss} + 0.57
\end{aligned}$$

Figure 4:
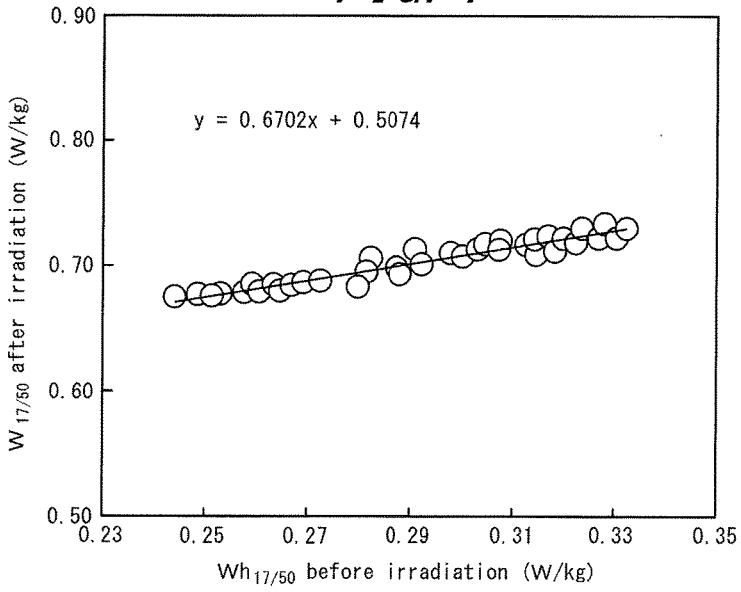
FIG. 4 is a graph showing a relationship between hysteresis loss $Wh_{17/50}$ before Ar plasma flame irradiation and total iron loss $W_{17/50}$ after Ar plasma flame irradiation.

Although containing some hypotheses, the above equation gives substantially the same result as a regression equation approximately derived from the effect of pre-irradiation hysteresis loss on post-irradiation total iron loss as shown in FIG. 4. This indicates the importance of reducing the pre-irradiation hysteresis loss to reduce the post-irradiation total iron loss.

In addition, while the above results were obtained in the case of plasma flame irradiation, we also recognized for laser irradiation and electron beam irradiation that post-irradiation total iron loss tends to decrease as pre-irradiation hysteresis loss is lower.

That is, our experiments showed:

(1) for the same iron loss before irradiation, the iron loss may decrease as the ratio of hysteresis loss to total iron loss is smaller, when irradiated with the same energy; and (2) even for the same iron loss before and after irradiation, eddy current loss may be reduced with less irradiation energy as the ratio of hysteresis loss to total iron loss before irradiation is smaller, and consequently, it becomes possible to reduce lattice defects applied in the steel sheet by irradiation and to even suppress hardening of the irradiated portion, thereby reducing both hysteresis loss and noise after irradiation.

Iron Loss Reduction and Noise Reduction by Charged Particles Smaller in Mass than Fe As shown in Table 1, we also found that post-irradiation hysteresis loss may be further reduced by using charged particles smaller in mass than Fe, for heat beam irradiation, light beam irradiation, and/or particle beam irradiation.

TABLE 1

| Means for Magnetic Domain Refinement | | Total Iron Loss $W_{17/50}$ (W/kg) | Hysteresis Loss $Wh_{17/50}$ (W/kg) | Maximum Hardness of Irradiated Portion Hv0.05 | Hardness of Non-irradiated Portion Hv0.05 |
|---|---|---|---|---|---|
| Ar Plasma Flame | Before Irradiation | 0.841 | 0.274 | — | — |
| | After Irradiation | 0.699 | 0.286 | 230.5 | 230.2 |
| Electron Beam | Before Irradiation | 0.841 | 0.275 | — | — |
| | After Irradiation | 0.698 | 0.283 | 228.5 | 231.4 |
| Laser | Before Irradiation | 0.842 | 0.275 | — | — |
| | After Irradiation | 0.698 | 0.291 | 240.1 | 229.6 |

As Table 1 shows, hysteresis loss is lower with Ar plasma flame irradiation and electron beam irradiation than with laser irradiation.

While the specific reason is unclear, it is conceivable that charged particles penetrate into the steel sheet deeper than laser and, consequently, the affected zone within the steel sheet disperse widely in the sheet thickness direction, resulting in a reduction in the amount of local regions having an excessively high lattice defect density. For an acceleration voltage of 150 kV, for example, the electron penetration depth is estimated to be, according to the Archard, Kanaya and Okayama model, 41 μm, which is as large as 18% of the sheet thickness for a sheet thickness of 0.23 mm. As our experiments also revealed that the coating/steel substrate undergoes less melting at any irradiated portions with plasma flame irradiation and electron beam irradiation than with laser irradiation, there is another possibility that hysteresis loss decreases more because of less lattice defects being applied at the time of solidification and less impurity elements being incorporated from the coating.

Iron Loss Reduction and Noise Reduction by Irradiating Irradiation Portion on Steel Sheet at Average Scanning Rate of 30 m/s or Lower A possible method to reduce the amount of local regions having an excessively high lattice defect density within a steel sheet is to irradiate the steel sheet with a heat beam, a light beam, or a particle beam with low irradiation energy per unit time over a long period of time. In this case, the energy of the irradiated heat beam, light beam, or particle beam is diffused from the irradiated surface into the steel during irradiation and, consequently, the temperature is raised in steel regions farther from the irradiated surface in the sheet thickness direction, resulting in a better magnetic domain refining effect. It is also possible to suppress excessive deformation due to local temperature rise in the irradiated portion, which would otherwise be observed with excessively high irradiation energy per unit time and with a short irradiation time.

In this way, we made attempts to minimize the hardening of a portion being irradiated with a heat beam, a light beam, or a particle beam, and discovered that the hardness of the irradiated portion may be made comparable with or lower than that of non-irradiated portions, and that magnetic properties drastically improve when no increase in the hardness of the irradiated portion is observed in hardness measurement.

The term "comparable" is used herein to describe a case where the difference (≥0) between an average of ten measured values of the hardness of non-irradiated portions and an average of ten measured values of the hardness of an irradiated portion, that is, where the increase in hardness due to irradiation is smaller than ½ of a standard deviation of ten measured values of the hardness of the non-irradiated portions.

Although the details of the mechanism by which the hardness of the irradiated portion was made comparable with or lower than that of non-irradiated portions remain unclear, we estimate as follows.

If an increase in the hardness of the irradiated portion is observed, as is the case with the conventional art, more defects occur as lattice defects caused by irradiating with a heat beam, a light beam, or a particle beam that lead to an increase in hysteresis loss (for example, high density dislocations), thereby deteriorating iron loss properties. In contrast, we believe that with our lattice defect application method, the hardness of the irradiated portion was reduced because the deformation resistance of an irradiated portion was reduced by a slight mobile dislocation applied, and so on. Note that "*JFE Technical Report No.* 18" (2007), p. 23 JP H03-13293 B2 reports that application of a mobile dislocation reduces the strength of the base material.

Our steel sheets and methods will now be described in detail below.

Material to be Irradiated

We provide grain-oriented electrical steel sheets which may or may not be provided with a coating such as an insulating coating on the steel substrate.

Figure 5:
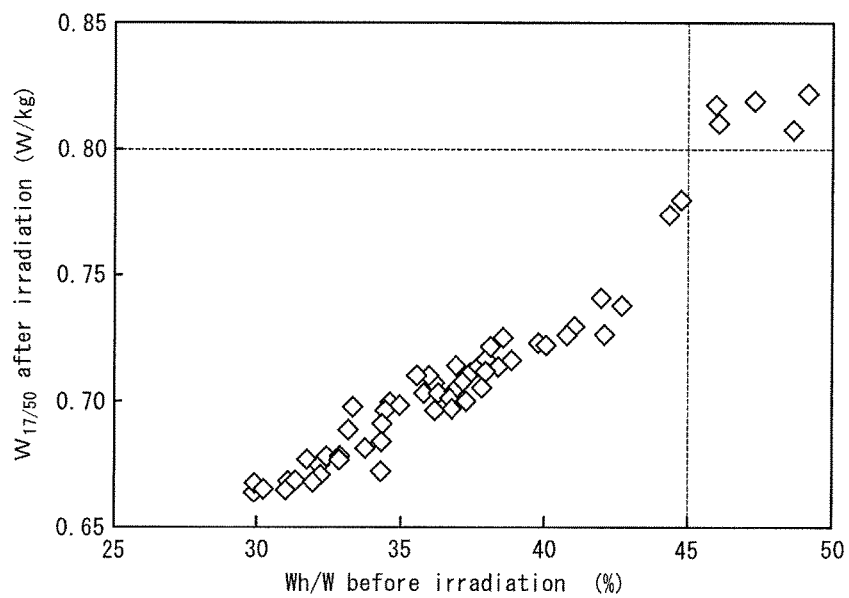
FIG. 5 is a graph showing a relationship between a ratio of hysteresis loss to total iron loss of steel sheets before electron beam irradiation and total iron loss $W_{17/50}$ after electron beam irradiation.

In addition, to set a total iron loss after heat beam, light beam, or particle beam irradiation to be less than 0.80 W/kg, it is important to set a ratio of hysteresis loss to total iron loss of a steel sheet before irradiation to be less than 45%, as shown in FIG. 5. Additionally, to obtain a further iron loss reduction, it is preferred to further reduce the percentage of hysteresis loss. Note that the results of measuring the hardness after irradiation of those samples for which the percentage of hysteresis loss was determined to be less than 45% all satisfy the specified conditions.

In this case, the plotted data points in FIG. 5 fall within the following ranges: total iron loss $W_{17/50}$ before irradiation of 0.75 W/kg to 0.96 W/kg; $B_8$ before irradiation of 1.880 T to 1.950 T; and film tension of 15 MPa to 16 MPa, and the irradiation was performed with an electron beam.

Figure 6:
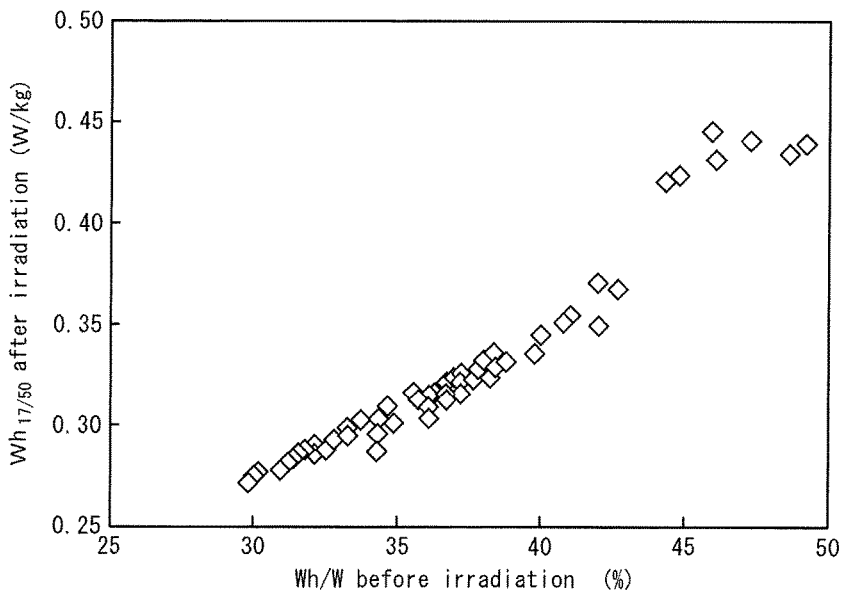
FIG. 6 is a graph showing a relationship between a ratio of hysteresis loss to total iron loss of steel sheets before electron beam irradiation and hysteresis loss $Wh_{17/50}$ after electron beam irradiation.

It can also be seen from FIGS. 5 and 6 that a steel sheet having a ratio of hysteresis loss to total iron loss of 45% or more shows an increase in post-irradiation total iron loss, in particular, hysteresis loss.

Next, Table 2 shows the results of the analysis of samples having a ratio of hysteresis loss to total iron loss (Wh/W) of either less than 45% or 45% or more, to determine their iron loss, increase in hardness of the irradiated portion, deflection, and noise after irradiation with a pulse laser. Note that the hardness, deflection, and noise were measured under the conditions described in the examples below. It should also be noted that the samples used for noise measurement were continuously cut out from the same coil in the longitudinal direction, with no cut-out within a range of 100 mm from the widthwise edges of the coil.

On the other hand, when the ratio of hysteresis loss to total iron loss is greater than 35%, the noise exceeds 40 dBA due to an increase in the hardness of the irradiated portion, although the irradiation condition of iron loss being 0.70 W/kg or lower is met. Moreover, when the ratio of hysteresis loss to total iron loss is 45% or more, the iron loss exceeds 0.80 W/kg.

Note that to set the percentage of hysteresis loss to be less than 45%, it is suffice to reduce closure domains by some methods, such as by making the orientation of crystal grains more in accord with <100>, by applying a tension coating to a steel sheet or the like, and such methods may be based on the conventional techniques. In addition, hysteresis loss may successfully be reduced more by using a new technique.

Heat Beam, Light Beam, or Particle Beam Irradiation Technique

We irradiate the steel sheet with a heat beam, a light beam, or a particle beam to form a local lattice defect region in the steel sheet and refine magnetic domains, thereby reducing iron loss. To this end, any method may be used that allows for local irradiation of the steel sheet with a heat beam, a light beam, or a particle beam, typically with the use of plasma flame irradiation, laser irradiation, and electron beam irradiation.

In forming a lattice defect region, a heat beam, a light beam, or a particle beam is scanned over a heat beam, light beam, or particle beam irradiation portion on a surface of the steel sheet, from one widthwise edge to the other widthwise edge of the steel sheet, in a direction forming an angle of 30° or less with a direction orthogonal to the rolling direction of the steel sheet. The scanning may be performed in a liner manner, or in a curved manner with a regular pattern such as a wave or the like.

In addition, multiple irradiation sources may be used for beam irradiation if the material that needs to be irradiated is too large in width.

Further, the steel sheet may be irradiated with a heat beam, a light beam, or a particle beam along the aforementioned linear or curved scanning line in a continuous or intermittent manner.

TABLE 2

| No. | Before Irradiation Wh/W (%) | Irradiation Energy (mJ/pulse) | Iron Loss after Irradiation $W_{17/50}$ (W/kg) | Increase in Hardness of Irradiated Portion (%) | Deflection after Irradiation (mm) | Noise after Irradiation (dBA) |
|---|---|---|---|---|---|---|
| 1 | 38 | 1.1 | 0.69 | 4 | 0.6 | 47 |
| 2 | 37 | 0.8 | 0.71 | 0 | 0.2 | 40 |
| 3 | 37 | 0.5 | 0.75 | 0 | 0.1 | 38 |
| 4 | 32 | 1.1 | 0.66 | 3 | 0.6 | 47 |
| 5 | 32 | 0.8 | 0.68 | 0 | 0.2 | 39 |
| 6 | 31 | 0.5 | 0.73 | 0 | 0.1 | 38 |
| 7 | 48 | 1.1 | 0.82 | 4 | 0.6 | 51 |
| 8 | 48 | 0.8 | 0.84 | 0 | 0.2 | 44 |
| 9 | 48 | 0.5 | 0.88 | 0 | 0.1 | 43 |

As is apparent from Table 2, when the ratio of hysteresis loss to total iron loss is less than 45%, both low iron loss as low as 0.80 W/kg or lower and low noise as low as 45 dBA or lower may be achieved at the same time by slightly reducing the irradiation energy.

In particular, when the ratio of hysteresis loss to total iron loss is less than 35%, both low iron loss as low as 0.70 W/kg or lower and low noise as low as 40 dBA or lower may be achieved at the same time by slightly reducing the irradiation energy.

Figure 7:
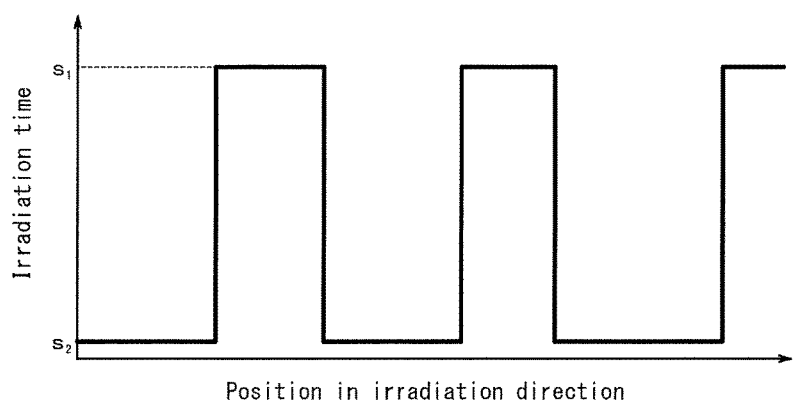
FIG. 7 is a graph showing a mode of electron beam irradiation.

In particular, for electron beam irradiation and the like, the irradiation is often repeated along the scanning line so that a long irradiation time ($s_1$) and a short irradiation time ($s_2$) alternate, as shown in FIG. 7. Distance intervals (hereinafter, "dot pitch") between repetitions of the irradiation are each preferably set to be 0.5 mm or less. Since $s_2$ is generally small enough to be ignored as compared with $s_1$ (in the case of pulse laser irradiation, $s_2$=0), the inverse of $s_1$ can be considered as the irradiation frequency. A dot pitch wider than 0.5 mm results in a reduction in the area irradiated with sufficient energy. The magnetic domains are therefore not sufficiently refined.

In addition, the beam scanning over an irradiation portion on the steel sheet is preferably performed at a scanning rate of 100 m/s or lower. A higher scanning rate may be more beneficial in terms of higher productivity and so on, whereas requiring higher energy per unit time to irradiate energy required for magnetic domain refinement. In particular, upon the scanning rate exceeding 100 m/s, the irradiation energy per unit time becomes excessively high, which may potentially impair the stability, lifetime and the like of the device.

On the other hand, slower scanning prolongs the period of time during which the irradiation portion on the steel sheet is irradiated with a heat beam, a light beam, or a particle beam. Therefore, the energy of the irradiated heat beam, light beam, or particle beam is diffused from the irradiated surface into the steel during irradiation and, consequently, the temperature is raised in steel regions farther from the irradiated surface in the sheet thickness direction. In this case, the steel substrate undergoes less melting at the irradiated portion, and the associated formation of a region with an excessively high dislocation density in the irradiated portion can be suppressed, both of which would often be found in faster scanning and when irradiation is performed with rapid temperature rise in a shorter time. Thus, a lower scanning rate is better and a scanning rate of 30 m/s or lower, in particular, achieves the above effect more easily.

In addition, the aforementioned scanning from one end to the other of the steel sheet is repeated with constant intervals of 2 mm to 10 mm in the rolling direction between repetitions of the irradiation. If the intervals are excessively short, productivity is excessively lowered, and therefore the intervals are each preferably 2 mm or more. Alternatively, if the intervals are excessively long, the magnetic domain refining effect is not sufficiently achieved, and therefore the intervals are each preferably 10 mm or less.

In addition to this, other conditions such as irradiation energy, beam diameter, nozzle diameter (for plasma flame irradiation) and the like are adjusted within different ranges and have different proper values depending on WD (working distance), the distance between the distal end of a torch and the steel sheet, the degree of vacuum, and the like, and therefore may be adjusted as appropriate based on the conventional knowledge.

Quantification of Hardening of Heat Beam, Light Beam, or Particle Beam Irradiation Portion Quantification of the hardening of a heat beam, light beam, or particle beam irradiation portion is performed by, for example, measuring the Vickers hardness. As used herein, the term "hardness" refers to the hardness of the steel substrate.

Generally, the surface of the steel sheet to which a tension coating or an oxide coating is applied is irradiated with laser, a plasma flame and the like. Such irradiation, however, may apply a stress to the coating, or cause the coating to partially evaporate or melt. Consequently, the coating may have different hardness in regions near the irradiated portion and in other regions, preventing direct comparison of the hardness of steel substrates at given points. Further, the coating is mostly brittle and is thus unfit for a Vickers hardness test, which is used to measure the hardness of a ductile material. The JIS Z 2244 standard also specifies to ensure the absence of any foreign matter such as oxides on the surface of the sample to be measured.

Therefore, the coating of each sample was removed in advance when measuring the hardness of the sample. After the coating removal treatment, the absence of the coating can be simply checked by EPMA measurement and the like. The removal method may be based on conventional knowledge, yet the coating should be carefully removed not to reduce the steel substrate. For example, when an oxide coating is removed with the use of a nitric acid solution, the solution for use is preferably diluted to a concentration of 5% or less. However, when the surface unevenness of the interface between the coating and the steel substrate is large, the steel substrate is slightly eluted upon removal of the coating. Excessive elution, however, eliminates lattice defect application regions, and therefore the reduction in the sheet thickness of the steel substrate should be limited to be 3 μm or less, and desirably 1 μm or less.

The hardness of the surface of each sample from which the coating had been removed was measured with a micro Vickers hardness meter. The test force was set to be 0.49 N (50 gf) and the holding time was set to be 15 seconds. Each sample was fixed with a magnet chuck and the like to stand still during the measurement.

Hardness was determined by averaging sufficient data items, taking into account variations in the measured data. In addition, when an impression had a ratio) of two diagonal lengths of 1.5 or more or when diagonal lengths were unclear, measurement was performed again.

It was also considered that every sample used in the hardness measurement is, desirably, sufficiently larger in size than the crystal grain diameter, and it was ensured that any stain caused by shearing or the like would not affect at least those portions near the regions for which the hardness after irradiation was measured.

Evaluation of Iron Loss

Samples of 280 mm long in a rolling direction and 100 mm wide in a direction orthogonal to the rolling direction were prepared and subjected to magnetometry (measurement of flux density $B_8$ and total iron loss $W_{17/50}$) by a single sheet tester (SST) according to the JIS C 2556 standard. Note that the measured values were represented as Epstein measurement equivalents. In addition, the same samples were subjected to measurement of a hysteresis B—H loop with maximum flux of 1.7 T and minimum flux of −1.7 T in DC magnetization (at 0.01 Hz or less), in which a hysteresis loss was represented by an iron loss obtained from one cycle of the B—H loop. Eddy current loss was calculated by subtracting, from the total iron loss, the hysteresis loss obtained by the DC magnetization measurement.

Evaluation of Deflection

Samples of 280 mm long in a rolling direction and 100 mm wide in a direction orthogonal to the rolling direction were placed on a horizontal plane and measured for their displacement from the horizontal plane with a laser displacement gauge, in which deflection was determined by subtracting the maximum deflection before the irradiation from the maximum deflection after the heat beam, light beam, or particle beam irradiation.

Evaluation of Noise

Figure 8:
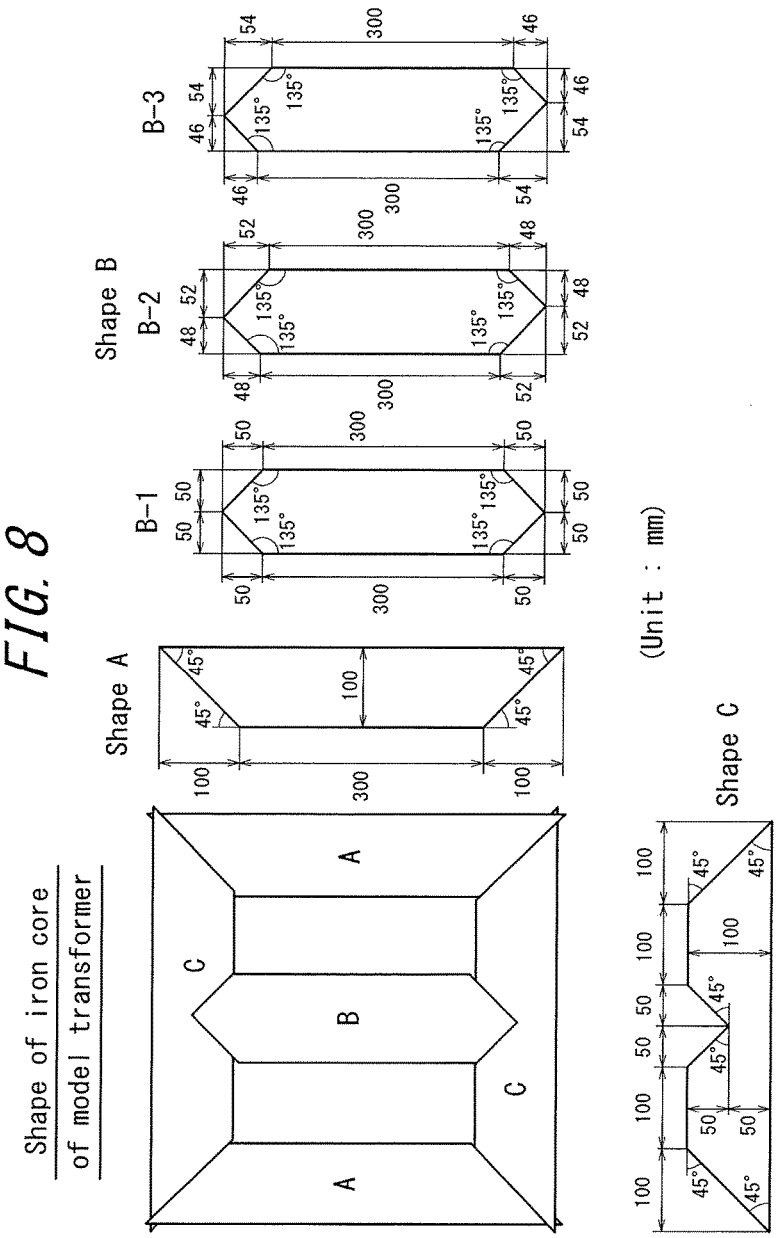
FIG. 8 is a view of illustrating the shape of an iron core of a model transformer.

Noise was evaluated using model transformers, each simulating a transformer with an iron core of stacked three-phase tripod type. As shown in FIG. 8, each model transformer was formed by steel sheets with outer dimensions of 500 mm square and a width of 100 mm. Steel sheets each having been sheared to be in shapes with beveled edges as shown in FIG. 8 were stacked to obtain a stack thickness of about 15 mm and an iron core weight of about 20 kg: i.e., 70 sheets of 0.23 mm thick steel sheets; 60 sheets of 0.27 mm thick steel sheets; or 80 sheets of 0.20 mm thick steel sheets. The measurements were performed so that the rolling direction matches the longitudinal direction of each sample sheared to have beveled edges. The lamination method was as follows: sets of two sheets were laminated in five steps using a step-lap joint scheme. Specifically, three types of central leg members (shape B), one symmetric member (B-1) and two different asymmetric members (B-2, B-3) (and two additional asymmetric members obtained by reversing the other two asymmetric members (B-2, B-3), and in total five types of central leg members) are used and, in practice, stacked in order of, for example, "B-3," "B-2," "B-1," "reversed B-2," and "reversed B-3."

The iron core components were stacked flat on a plane and then sandwiched and clamped between bakelite retainer plates under a pressure of about 0.1 MPa. The transformers were excited with the three phases being 120 degrees out of phase with one another, in which noise was measured with a flux density of 1.7 T. A microphone was used to measure noise at (two) positions distant by 20 cm from the iron core surface, in which noise levels were represented in units of dBA with A-scale frequency weighting.

Chemical Composition of Material

Our grain-oriented electrical steel sheets have been described above in the context of a material to be irradiated, which has a chemical composition including the elements shown below.

Si: 2.0 Mass % to 8.0 Mass %

Silicon (Si) is an element effective in terms of enhancing electrical resistance of steel and improving iron loss properties thereof. However, a Si content in steel below 2.0 mass % cannot provide a sufficient iron loss reducing effect. On the other hand, a Si content in steel above 8.0 mass % significantly reduces the formability and the flux density of steel. Therefore, the content of Si is preferably 2.0 mass % to 8.0 mass %.

C: 50 Mass Ppm or Less

Carbon (C) is added for the purpose of improving the texture of a hot rolled steel sheet, yet to prevent magnetic aging from occurring in the resulting product steel sheet, the content of carbon is preferably reduced to 50 mass ppm or less.

Mn: 0.005 Mass % to 1.0 Mass %

Manganese (Mn) is an element necessary to achieve better hot workability of steel. When the content of Mn in steel is below 0.005 mass %, however, this effect is insufficient. On the other hand, when the content of Mn is above 1.0 mass %, the magnetic flux of the resulting product steel sheet worsens. Therefore, the content of Mn is preferably 0.005 mass % to 1.0 mass %.

In addition to the above basic components, the material may also contain, to improve magnetic properties, at least one element selected from the following elements as deemed appropriate:

Ni: 0.03 mass % to 1.50 mass %, Sn: 0.01 mass % to 1.50 mass %, Sb: 0.005 mass % to 1.50 mass %, Cu: 0.03 mass % to 3.0 mass %, P: 0.03 mass % to 0.50 mass %, Mo: 0.005 mass % to 0.10 mass %, and Cr: 0.03 mass % to 1.50 mass %.

Nickel (Ni) is an element useful in improving the texture of a hot rolled steel sheet for better magnetic properties thereof. However, a Ni content in steel below 0.03 mass % is less effective in improving magnetic properties, while a Ni content in steel above 1.50 mass % destabilizes secondary recrystallization, resulting in deteriorated magnetic properties. Thus, the content of Ni is preferably 0.03 mass % to 1.50 mass %.

In addition, tin (Sn), antimony (Sb), copper (Cu), phosphorus (P), molybdenum (Mo) and chromium (Cr) are useful elements in terms of improving magnetic properties of steel. However, each of these elements becomes less effective in improving magnetic properties of steel when contained in the steel in amounts less than the aforementioned lower limit, while inhibiting the growth of secondary recrystallized grains in the steel when contained in the steel in amounts greater than the aforementioned upper limit. Therefore, these elements are preferably contained in amounts within the respective ranges specified above.

The balance other than the aforementioned elements includes Fe and incidental impurities that are incorporated during the manufacturing process.

EXAMPLES

Example 1

In this example, used as samples irradiated with a heat beam, a light beam, or a particle beam were grain-oriented electrical steel sheets with coating and without coating; in both cases $B_8$ in the rolling direction was set to be in the range of 1.89 T to 1.95 T. Each of the steel sheets with coating has a structure such that a dual-layer coating is formed on the steel substrate surfaces, including a vitreous coating, which is mainly composed of $Mg_2SiO_4$, and a coating (phosphate-based coating), which is formed by baking an inorganic treatment solution thereon. The iron losses are as shown in Table 3.

As methods to apply lattice defects by heat beam irradiation, light beam irradiation, or particle beam irradiation, laser irradiation and electron beam irradiation and, for comparison, ballpoint pen scribing and knife scribing were applied. In these irradiation and scribing operations, steel sheets were scanned with the laser irradiation portion, the electron beam irradiation portion, the ballpoint pen tip, or the knife tip, in a direction orthogonal to the rolling direction, across the entire width thereof, in a linear manner. In this case, for laser irradiation, the irradiation was carried out by continuous irradiation (dot pitch: 0) or pulse irradiation (pulse interval: 0.3 mm), in which the scanning rate was set to be 10 m/s and the intervals between repetitions of the irradiation in the rolling direction were each set to be 5 mm or 3.5 mm. For electron beam irradiation, the irradiation was performed with a dot pitch of 0.3 mm, an irradiation frequency of 100 kHz, a scanning rate of 30 m/s or 4 m/s, intervals between repetitions of the irradiation in the rolling direction of 5 mm or 3.5 mm. On the other hand, the ballpoint pen scribing was performed using N5000, which is manufactured by Zebra Co., Ltd., with a 50 g weight on top, while the knife scribing was manually performed under a suitable load. As the laser, a fiber laser was used for continuous irradiation with a wavelength of 1070 nm, and a YAG laser was used for pulse irradiation with a wavelength of 1064 nm. In the electron beam irradiation, the acceleration voltage was set to be 40 kV or more, the shortest distance (WD) from the center of a converging coil to the material to be irradiated was set to 700 mm, and the pressure in the working chamber was set to be 2 Pa or less.

After application of lattice defects by the aforementioned method, the samples with coating were subjected, prior to hardness measurement, to the following treatment to remove the coating. First, each of the samples was immersed for 7 minutes in a solution which was obtained by mixing 1200 g of sodium hydroxide with 4 L of water and heated to 110° C., to remove the phosphate-based coating. Subsequently, 50 mL of a 67.5% nitric acid was diluted with 1 L of water to obtain a 4.4% nitric acid aqueous solution (room temperature). Each of the samples was then immersed in the nitric acid aqueous solution thus obtained for 2 to 4 minutes to remove the vitreous coating. Of course, each treatment was performed so as not to leave the treatment solution on the surfaces of the steel sheet after the treatment.

The hardness was measured in regions near irradiation marks made by the heat beam irradiation, light beam irradiation, or particle beam irradiation, or near scribe marks. When irradiation marks were not clear, lines may be drawn on the surface of the steel sheet with an oil-based pen prior to irradiation to have some of the lines vaporized upon irradiation and disappear from those portions irradiated with the heat beam, which allows the irradiated portions to be identified. The influence of the pen would be minor, yet if any concern, it is suffice to conduct an irradiation test with slightly increased irradiation energy to identify the positions of irradiation marks. In addition, hardness measurement was made in the regions, each having a distance X in the rolling direction from the center of an irradiation mark or a scribe mark of 0.50 mm or less, at ten locations for each X (0 mm, 0.05 mm, 0.07 mm, 0.13 mm, 0.25 mm, and 0.50 mm). The average was considered to be the measured values of hardness. Hereinafter, the average hardness of ten locations will be simply referred to as "hardness." Note that depending on the magnetic domain refining techniques and on the heat beam, light beam, or particle beam irradiation conditions, unevenness may increase in some irradiated or scribed portions, for which portions, however, the hardness measurement was not performed. On the other hand, the hardness of those portions not irradiated with a heat beam, a light beam, or a particle beam was determined by measuring the hardness at positions distant by 2 mm from the irradiation marks or scribe marks.

The test results are shown in Tables 3 and 4.

In Table 4, the "Maximum Hardness near Irradiation Marks" refers to the maximum value of hardness obtained by measuring the hardness in the regions, each having a distance X in the rolling direction from the center of an irradiation mark or a scribe mark of 0.50 mm or less. Note that underline indicates values outside our scope.

TABLE 3

| No. | Coating | Means for Applying Lattice Defects | Scanning Rate (m/s) | Line Interval (mm) | Iron Loss before Irradiation (1) Total Iron Loss $W_{17/50}$ (W/kg) | (2) Hysteresis Loss $Wh_{17/50}$ (W/kg) | (2) ÷ (1) × 100 (%) | Iron Loss after Irradiation (3) Total Iron Loss $Wh_{17/50}$ (W/kg) | (4) Hysteresis Loss $Wh_{17/50}$ (W/kg) | (4) − (2) (W/kg) | Deflection after Irradiation (mm) | Noise after Irradiation (dBA) | Remarks |
|---|---|---|---|---|---|---|---|---|---|---|---|---|---|
| 1 | Applied | Electron Beam | 35 | 5.0 | 0.835 | 0.283 | 33.9 | 0.689 | 0.307 | 0.024 | 0.5 | 39.5 | Inventive Example |
| 2 | Applied | Electron Beam | 35 | 5.0 | 0.838 | 0.242 | 28.9 | 0.670 | 0.270 | 0.028 | 0.2 | 38.2 | Inventive Example |
| 3 | Applied | Electron Beam | 35 | 5.0 | 0.785 | 0.271 | 34.5 | 0.698 | 0.288 | 0.017 | 0.1 | 38.4 | Inventive Example |
| 4 | Applied | Electron Beam | 35 | 5.0 | 0.791 | 0.282 | 35.7 | 0.708 | 0.296 | 0.014 | 0.2 | 38.6 | Inventive Example |
| 5 | Applied | Electron Beam | 35 | 5.0 | 0.825 | 0.315 | 38.2 | 0.719 | 0.331 | 0.016 | 0.2 | 38.1 | Inventive Example |
| 6 | Applied | Electron Beam | 35 | 5.0 | 0.862 | 0.241 | 28.0 | 0.673 | 0.272 | 0.031 | 0.3 | 37.9 | Inventive Example |
| 7 | Applied | Electron Beam | 35 | 5.0 | 0.803 | 0.241 | 30.0 | 0.684 | 0.266 | 0.025 | 0.2 | 37.5 | Inventive Example |
| 8 | Applied | Electron Beam | 35 | 5.0 | 0.801 | 0.240 | 30.0 | 0.668 | 0.274 | 0.034 | 0.2 | 38.1 | Inventive Example |
| 9 | Not Applied | Electron Beam | 35 | 5.0 | 0.914 | 0.325 | 35.6 | 0.732 | 0.342 | 0.017 | 0.3 | 37.6 | Inventive Example |
| 10 | Not Applied | Electron Beam | 35 | 5.0 | 0.942 | 0.291 | 30.9 | 0.699 | 0.312 | 0.021 | 0.3 | 38.0 | Inventive Example |
| 11 | Applied | Continuous Laser | 10 | 5.0 | 0.764 | 0.250 | 32.7 | 0.675 | 0.284 | 0.034 | 0.5 | 39.8 | Inventive Example |
| 12 | Applied | Continuous Laser | 10 | 5.0 | 0.778 | 0.248 | 31.9 | 0.689 | 0.273 | 0.025 | 0.1 | 37.2 | Inventive Example |
| 13 | Applied | Pulse Laser | 10 | 5.0 | 0.831 | 0.251 | 30.2 | 0.685 | 0.282 | 0.031 | 0.2 | 38.6 | Inventive Example |
| 14 | Applied | Pulse Laser | 10 | 5.0 | 0.784 | 0.272 | 34.7 | 0.690 | 0.300 | 0.028 | 0.4 | 39.5 | Inventive Example |
| 15 | Applied | Pulse Laser* | 10 | 5.0 | 0.811 | 0.266 | 32.8 | 0.680 | 0.303 | 0.037 | 0.7 | 44.5 | Comparative Example |
| 16 | Applied | Pulse Laser* | 10 | 5.0 | 0.795 | 0.285 | 35.8 | 0.693 | 0.322 | 0.037 | 0.8 | 48.1 | Comparative Example |
| 17 | Applied | Ballpoint Pen | 0.04 | 5.0 | 0.813 | 0.254 | 31.2 | 0.727 | 0.263 | 0.009 | 0.2 | — | Comparative Example |
| 18 | Applied | Knife | 0.04 | 5.0 | 0.845 | 0.274 | 32.4 | 0.795 | 0.314 | 0.040 | 0.9 | — | Comparative Example |
| 19 | Applied | Continuous Laser | 4 | 5.0 | 0.841 | 0.261 | 31.0 | 0.683 | 0.282 | 0.021 | 0.2 | 38.6 | Inventive Example |
| 20 | Applied | Electron Beam | 35 | 3.5 | 0.825 | 0.254 | 30.8 | 0.686 | 0.279 | 0.025 | 0.2 | 38.6 | Inventive Example |
| 21 | Applied | Continuous Laser | 10 | 3.5 | 0.814 | 0.252 | 31.0 | 0.691 | 0.275 | 0.023 | 0.3 | 39.1 | Inventive Example |
| 22 | Applied | Continuous Laser | 10 | 5.0 | 0.842 | 0.245 | 29.1 | 0.675 | 0.276 | 0.031 | 0.3 | 39.3 | Inventive Example |
| 23 | Applied | Continuous Laser | 4 | 5.0 | 0.862 | 0.250 | 29.0 | 0.675 | 0.278 | 0.028 | 0.2 | 38.1 | Inventive Example |
| 24 | Applied | Continuous Laser | 10 | 5.0 | 0.919 | 0.423 | 46.0 | 0.806 | 0.431 | 0.008 | 0.2 | 45.0 | Comparative Example |
| 25 | Applied | Electron Beam | 35 | 5.0 | 0.924 | 0.435 | 47.1 | 0.794 | 0.442 | 0.011 | 0.6 | 47.6 | Comparative Example |
| 26 | Applied | Continuous Laser | 10 | 5.0 | 0.926 | 0.415 | 44.8 | 0.795 | 0.425 | 0.009 | 0.2 | 44.9 | Inventive Example |
| 27 | Applied | Electron Beam | 4 | 5.0 | 0.903 | 0.399 | 44.2 | 0.797 | 0.406 | 0.007 | 0.3 | 44.8 | Inventive Example |
| 28 | Applied | Continuous Laser | 10 | 5.0 | 0.847 | 0.295 | 34.8 | 0.689 | 0.301 | 0.006 | 0.3 | 38.2 | Inventive Example |
| 29 | Applied | Continuous Laser | 10 | 3.5 | 0.777 | 0.261 | 33.6 | 0.629 | 0.272 | 0.011 | 0.4 | 37.2 | Inventive Example |
| 30 | Applied | Electron Beam | 35 | 5.0 | 0.775 | 0.231 | 29.8 | 0.638 | 0.241 | 0.010 | 0.3 | 34.5 | Inventive Example |

*No. 15 and No. 16: irradiated with a high-output pulse laser

TABLE 4

| ID | (5) Hardness of Non-irradiated Portion Hv 0.05 | (6) Maximum Hardness within Irradiation Mark Hv 0.05 | (6) − (5) Hardness Difference | {(6) − (5)}/(5) × 100 (%) | (7) Maximum Hardness near Irradiation Mark Hv 0.05 | {(7) − (5)}/(5) × 100 (%) | (8) Standard Deviation of Measurements at Ten Locations in Non-irradiated Portion (Hv) | (8)/(5) × 100 (%) | Remarks |
|---|---|---|---|---|---|---|---|---|---|
| 1 | 232.5 | 231.9 | −0.6 | −0.3 | 229.2 | −1.4 | 17.1 | 7.4 | Inventive Example |
| 2 | 234.5 | 232.5 | −2 | −0.9 | 234.8 | 0.1 | 18.5 | 7.9 | Inventive Example |
| 3 | 231.6 | 233.4 | 1.8 | 0.8 | 233.4 | 0.8 | 16.1 | 7.0 | Inventive Example |
| 4 | 234.8 | 227.2 | −7.6 | −3.2 | 230.5 | −1.8 | 17.6 | 7.5 | Inventive Example |
| 5 | 230.9 | 231.3 | 0.4 | 0.2 | 231.3 | 0.2 | 14.5 | 6.3 | Inventive Example |
| 6 | 236.4 | 234.1 | −2.3 | −1.0 | 234.1 | −1.0 | 17.5 | 7.4 | Inventive Example |
| 7 | 234.1 | 231.3 | −2.8 | −1.2 | 234.5 | 0.2 | 16.3 | 7.0 | Inventive Example |
| 8 | 235.4 | 233.6 | −1.8 | −0.8 | 234.6 | −0.3 | 16.8 | 7.1 | Inventive Example |
| 9 | 214.6 | 206.1 | −8.5 | −4.0 | 213.5 | −0.5 | 2.0 | 1.0 | Inventive Example |
| 10 | 211.9 | 200.8 | −11.1 | −5.2 | 212.5 | 0.3 | 2.3 | 1.1 | Inventive Example |
| 11 | 237.2 | 239.5 | 2.3 | 1.0 | 239.5 | 1.0 | 17.5 | 7.4 | Inventive Example |
| 12 | 237.4 | 240.2 | 2.8 | 1.2 | 240.2 | 1.2 | 17.8 | 7.5 | Inventive Example |
| 13 | 232.1 | 233.4 | 1.3 | 0.6 | 236.5 | 1.9 | 13.8 | 5.9 | Inventive Example |
| 14 | 236.9 | 243.8 | 6.9 | 2.9 | 243.8 | 2.9 | 18.1 | 7.6 | Inventive Example |
| 15 | 237.1 | 249.2 | 12.1 | 5.1 | 249.2 | 5.1 | 18.2 | 7.7 | Comparative Example |
| 16 | 231.4 | 242.6 | 11.2 | 4.8 | 237.1 | 2.5 | 16.7 | 7.2 | Comparative Example |
| 17 | 231.0 | 244.5 | 13.5 | 5.8 | 244.5 | 5.8 | 17.9 | 7.7 | Comparative Example |
| 18 | 231.4 | not available | — | — | 276.1 | 19.3 | 19.4 | 8.4 | Comparative Example |
| 19 | 248.6 | 240.1 | −8.5 | −3.4 | 244.6 | −1.6 | 15.2 | 6.1 | Inventive Example |
| 20 | 238.4 | 236.5 | −1.9 | −0.8 | 236.8 | −0.7 | 14.8 | 6.2 | Inventive Example |
| 21 | 230.7 | 233.5 | 2.8 | 1.2 | 233.5 | 1.2 | 15.7 | 6.8 | Inventive Example |
| 22 | 229.4 | 233.3 | 3.9 | 1.7 | 234.5 | 2.2 | 18.5 | 8.1 | Inventive Example |
| 23 | 228.5 | 220.7 | −7.8 | −3.4 | 231.8 | 1.4 | 16.4 | 7.2 | Inventive Example |
| 24 | 218.4 | 220.9 | 2.5 | 1.1 | 224.3 | 2.7 | 16.1 | 7.4 | Comparative Example |
| 25 | 216.4 | 227.6 | 11.2 | 5.2 | 221.1 | 2.2 | 16.8 | 7.8 | Comparative Example |
| 26 | 217.3 | 216.4 | −0.9 | −0.4 | 216.4 | −0.4 | 15.6 | 7.2 | Inventive Example |
| 27 | 215.3 | 216.6 | 1.3 | 0.6 | 217.3 | 0.9 | 14.9 | 6.9 | Inventive Example |
| 28 | 228.9 | 230.5 | 1.6 | 0.7 | 230.5 | 0.7 | 16.5 | 7.2 | Inventive Example |
| 29 | 224.2 | 227.2 | 3 | 1.3 | 229.1 | 2.2 | 17.3 | 7.7 | Inventive Example |
| 30 | 226.7 | 224.9 | −1.8 | −0.8 | 226.8 | 0.0 | 16.1 | 7.1 | Inventive Example |

As can be seen from Tables 3 and 4, by irradiating those steel sheets having a ratio of hysteresis loss to total iron loss of 35% or less before irradiation with a heat beam, a light beam, or a particle beam, the total iron loss $W_{17/50}$ may be set 0.70 W/kg or lower and the noise 40 dBA or lower. However, if the irradiation is not performed under appropriate conditions, as a sample of No. 15 shows, a departure from the aforementioned ranges occurs. In the sample of No. 15, the irradiation was performed under a condition in which the output was excessively increased as compared to the conventional art.

In addition, in many of the aforementioned steel sheets having total iron loss and noise scores below 0.70 W/kg and below 40 dBA, respectively, an increase in the hardness of the irradiated portions from the hardness of those portions not irradiated with a heat beam, a light beam, or a particle beam, is sufficiently smaller than the standard deviation of the measurements at ten locations. Therefore, there is no significant difference between the hardness of those portions not irradiated with a heat beam, a light beam, or a particle beam and the hardness of the irradiated portions. That is, the irradiated portions do not show any increase in hardness. Note that some of the other samples showed a reduction in hardness due to irradiation.

On the other hand, in the case of pulse laser irradiation, as indicated by, in particular, the samples of No. 15 and No. 16, the increase in hysteresis loss due to irradiation is large and the increase in hardness in the irradiated portions is quite significant.

In addition, as the sample of No. 16 shows, the iron loss may be reduced below 0.70 W/kg for even those steel sheets having a ratio of hysteresis loss to total iron loss greater than 35%. It is necessary, however, to irradiate a steel sheet with high energy for achieving sufficient magnetic domain refining and, consequently, the hardness of the irradiated portions increases and the sample suffers larger deflection and produces louder noise.

As can be seen from comparison of the samples of No. 7, No. 8, and No. 13 and comparison of the samples of No. 3 and No. 14, the materials irradiated with an electron beam achieve a better balance between iron loss and noise, than those irradiated with laser.

From comparison of the samples of No. 22 and No. 23, it is understood that slower scanning provides a better balance between iron loss and noise.

In contrast, in the case of magnetic domain refining being performed with the use of lines scribed on a surface of a steel sheet with a ballpoint pen, a knife and the like, a sufficient iron loss reducing effect is not obtained, and even worse, knife scribing causes a substantial increase in the hardness of scribed portions and an increase in hysteresis loss.

In addition, as can be seem from the samples of No. 26 and No. 27, those steel sheets having a ratio of hysteresis loss to total iron loss of 45% or less before irradiation may be irradiated with a heat beam, a light beam, or a particle beam so as not to cause an increase in the hardness of irradiated portions, thereby reducing the total iron loss and noise scores below 0.80 W/kg and below 45 dBA.

Note that the samples of No. 28 to No. 30 each have a sheet thickness of 0.20 mm, and the other samples each have a sheet thickness of 0.23 mm.

The invention claimed is:

1. A method of manufacturing a grain-oriented electrical steel sheet comprising magnetic domains refined by lattice defect regions being locally formed on a surface of or within the steel sheet by irradiating the steel sheet with a heat beam, a light beam or a particle beam, wherein the lattice defect regions have a hardness, as measured by a micro Vickers hardness meter, equal to or lower than that of other regions, the method comprising:
- selecting a steel sheet having a ratio of hysteresis loss to total iron loss of less than 45% by screening, and
- irradiating the steel sheet with a heat beam, a light beam or a particle beam, in a direction forming an angle of 30° or less with a direction orthogonal to a rolling direction, at periodic intervals of 10 mm or less in the rolling direction.

2. The method according to claim 1, wherein irradiating with the particle beam is irradiating with charged particles smaller in mass than Fe.

3. The method according to claim 2, wherein the irradiating with a heat beam, a light beam, or a particle beam is performed under a condition in which the beam is scanned over an irradiation portion on the steel sheet at an average rate of 30 m/s or lower.

4. The method according to claim 1, wherein the irradiating with a heat beam, a light beam, or a particle beam is performed under a condition in which the beam is scanned over an irradiation portion on the steel sheet at an average rate of 30 m/s or lower.

* * * * *